(12) United States Patent
Graumann

(10) Patent No.: US 10,505,707 B2
(45) Date of Patent: Dec. 10, 2019

(54) SYSTEM AND METHOD FOR DRIFT COMPENSATION IN DATA COMMUNICATIONS

(71) Applicant: Microsemi Storage Solutions, Inc., Aliso Viejo, CA (US)

(72) Inventor: Peter Graumann, Calgary (CA)

(73) Assignee: MICROSEMI SOLUTIONS (U.S.), INC, Aliso Viejo, CA (US)

(*) Notice: Subject to any disclaimer, the term of this patent is extended or adjusted under 35 U.S.C. 154(b) by 0 days.

(21) Appl. No.: 16/206,072

(22) Filed: Nov. 30, 2018

(65) Prior Publication Data

US 2019/0207740 A1 Jul. 4, 2019

Related U.S. Application Data

(60) Provisional application No. 62/611,285, filed on Dec. 28, 2017.

(51) Int. Cl.
*H04L 25/03* (2006.01)
*H04L 7/00* (2006.01)
(Continued)

(52) U.S. Cl.
CPC .......... *H04L 7/0079* (2013.01); *H04L 1/0045* (2013.01); *H04L 25/063* (2013.01)

(58) Field of Classification Search
CPC .... H04L 7/0079; H04L 25/063; H04L 1/0045
See application file for complete search history.

(56) References Cited

U.S. PATENT DOCUMENTS 8,705,606 B2 * 4/2014 Farjad-Rad ....... H04L 25/03019
375/232
9,331,780 B1 * 5/2016 Zhou ..................... H04B 10/25
(Continued)

FOREIGN PATENT DOCUMENTS

EP 1641165 A1 3/2006
EP 1675282 A2 6/2006

OTHER PUBLICATIONS

International Patent Application No. PCT/US2018/63418, International Search Report and Written Opinion dated Mar. 21, 2019.

*Primary Examiner* — Dac V Ha
(74) *Attorney, Agent, or Firm* — Leber IP Law; David C. Robertson

(57) ABSTRACT

A method and system are provided for drift compensation, providing a live data approach to sampler offset calibration, such as for voltage and/or temperature (VT) drift. A serializer/deserializer (SerDes) system includes a SerDes receiver and receiver logic, the receiver logic including a forward error correction (FEC) module. A drift compensation device, or drift compensation engine, receives live error corrections from the FEC module based on FEC operations performed on live traffic passing through the SerDes receiver. A drift compensation command is provided to a data sampler in the SerDes receiver, to adjust a sampling voltage of the data sampler. When the system includes a plurality of data samplers, the drift compensation device determines the data sampler with which an error correction is associated. The drift compensation command can be sent after a threshold criterion is satisfied, such as completion of a statistics collection period, or a threshold number of corrections.

26 Claims, 6 Drawing Sheets

(51) Int. Cl.
  *H04L 1/00*   (2006.01)
  *H04L 25/06*  (2006.01)

(56) References Cited

U.S. PATENT DOCUMENTS

2005/0271137 A1* 12/2005 Kolze .............. H04L 25/03006
                                                        375/233
2014/0108879 A1   4/2014 Hirth \* cited by examiner

SYSTEM AND METHOD FOR DRIFT COMPENSATION IN DATA COMMUNICATIONS

CROSS REFERENCE TO RELATED APPLICATIONS

This application claims the benefit of priority of U.S. Provisional Patent Application No. 62/611,285 filed Dec. 28, 2017, which is hereby incorporated by reference.

FIELD

The present disclosure relates generally to the field of data communications. More particularly, the present disclosure relates to a system and method for drift compensation.

BACKGROUND

Data communications can be performed using a serializer/deserializer (SerDes), which typically includes a pair of functional blocks that convert between serial data and parallel data. The SerDes can be implemented in an integrated circuit transceiver, such as on a SerDes link between two pins on a board.

FIG. 1A illustrates a known SerDes communication link including a SerDes transmitter 10, a channel 20, a SerDes receiver 30, receiver logic 40 and forward error correction (FEC) module 42. The SerDes transmitter 10 includes a Parallel In Serial Out (PISO) converter 12. Since the clock frequencies used within an integrated device are much slower than the transmission rate on a serial line, the input to the transmitter 10 is a parallel set of values that are serially shifted out of the PISO converter 12 to create a high speed serial stream. The SerDes transmitter 10 optionally includes a transmit (TX) filter 14 configured to combat inter-symbol interference (ISI) occurring in the channel 20. A simple TX filter 14 is often used, such as a 3-tap finite impulse response (FIR) filter. In some implementations, the channel 20 physically comprises bond wires, package pins and physical board traces or cables, each of which can introduce ISI that must be compensated for within the overall system.

The SerDes receiver 30 includes one or more samplers 32. Prior to sampling, a receiver (RX) filter 34 can be provided to remove as much ISI as possible through standard filtering operations. In implementations in which the channel is a low-pass channel, the RX filter 34 implements a high-pass function often implemented as a FFE (Feed-Forward Equalizer) or a CTLE (Continuous Time Linear Equalizer). The sampler(s) 32 convert the received signal back into a serial stream of 1s and 0s. A Decision Feedback Equalizer (DFE) 36 uses previously decided bits and decisions on past samples to further equalize the channel, often by multiplying up the number of physical samplers within a system or changing where the samplers are located. A Serial In Parallel Out (SIPO) converter 38 converts the high-speed received stream of 1s and 0s back to a lower frequency parallel interface. Note while line rates of SerDes can be 25 GHz, 56 GHz or even 112 GHz, chip-internal clocks tend to be in the range 500 MHz to 1.5 GHz.

FIG. 1B illustrates a simplified view of SerDes receiver 30 and receiver logic 40. The SerDes receiver 30 includes one or more data samplers 32. A DC input is provided within the SerDes receiver 30 for offline calibration of the one or more data samplers 32. The receiver logic 40 receives and operates on the raw bits from the SerDes receiver 30. The receiver logic 40 can have similar or higher complexity than the SerDes receiver 30, and often includes its own microprocessor to help offload some of the tasks.

Historically, a SerDes link with 1e-15 or 1e-12 error rate has not included forward error correction (FEC). As channel speeds increase, ISI also increases, forcing larger and more complex receiver designs that now require a FEC to be included in order to achieve bit error rate requirements. Many faster SerDes links now include FEC, such as FEC 42 in FIG. 1B, which can be provided as part of the receiver logic 40. The receiver logic 40 can identify FEC boundaries, extract FEC blocks from the input data stream, and pass these blocks through the FEC module 42.

Offset calibration (OsCal) is desirable to ensure accurate operation and to compensate for "drift". Consider FIG. 2, which illustrates a simplified eye diagram for a normal sampler, such as a data sampler 32. The received analog waveform exists somewhere in the area between the inner eye boundary 50 and the outer eye boundary 52, and most often goes half way between these boundaries, either in the upper eye 56 or in the lower eye 58. A sampler, such as data sampler 32, has a sampling level, or location, 54 that is ideally sitting at the middle of the upper inner eye boundary and the lower inner eye boundary, nominally 0V DC. Any analog signal above the sampling level is taken to be a 1 while anything below the sampling level is taken to be a 0. In doing so, a sampler such as the data sampler 32 converts an analog waveform into a digital value using the sampling level.

FIG. 3 illustrates an eye diagram for a sampler, such as the data sampler 32, where the sampling level exhibits an offset. In FIG. 3, the sampling level has drifted up, unintentionally and perhaps due to voltage or temperature (VT) drift, to be within the upper eye 56, as shown by offset high sampling level 64. For example, what was presumed to have been ground may have moved up from 0 mV to 10 mV. In such a situation, the sampler 32 will sometimes convert a signal in the upper eye to be a 0 (when the signal is below the offset sampling level 64) and thereby make a 1->0 bit-flip, which requires correction. With a sampler offset in the upper eye, the sampler will make many 1->0 flips, and will make almost no 0->1 flips. Moving the offset sampling level 64 down will eventually bring the level below the upper inner eye boundary 50 and significantly reduce the bit-error rate.

Offset calibration is typically performed before a device is put into service. A known off-line OsCal method is to set the input to a sampler to 0V DC and then allow the sampler to collect digital samples. If the sampling level is truly 0V DC, then random noise will cause the sampler to generate 50% ones and 50% zeroes. If, for example, the actual sampling level is higher than 0V then the sampled values will be biased towards 0s. If, for example, the actual sampling level is lower than 0V then the sampled values will be biased towards 1s. Given this outcome, the OsCal method can determine that the sampling level is to be decreased, or increased, respectively. OsCal can be repeated later, to determine whether further calibration is needed, but repeating this procedure requires taking the sampler out of service during the repeated OsCal.

FIG. 4 illustrates a known dual SerDes receiver. In the SerDes receiver of FIG. 4, two completely separate SerDes receivers 30-1 and 30-2 are provided in parallel, to facilitate being able to perform the OsCal method and still process data. With two receivers available, in a first state as shown in FIG. 4 a first receiver 30-1 is processing the live traffic while a second receiver 30-2 is taken off-line allowing the OsCal method to be run on all the data samplers 32-2. In this first state, switches 31 and 33 are in respective first positions.

In a second state (not shown, but with the switches 31 and 33 in FIG. 4 being in opposite positions), the second receiver 30-2 is processing the live traffic, and the first receiver 30-1 is taken off-line allowing the OsCal method to be run on all the data samplers 32-1. These two parallel receivers take up a lot of physical area, sometimes double the area for many components. Each SerDes receiver 30-1 and 30-2 is performing offset calibration while the other is processing live data traffic, and the receivers regularly switch operations, possibly alternating every few seconds.

When a SerDes receiver is in service, the device is in open loop. When entering open loop, the thermal environment may not yet have reached equilibrium or full operating conditions, i.e. the voltage/temperature (VT) situation may not yet have stabilized. There are also variations in power requirements as circuitry in the overall system reaches full operating conditions; such changes in power requirements lead to different output voltages, which can contribute to VT drift. There can be a significant difference, or delta, between the thermal and power environments during operation as compared to the pre-service environment.

Improvements in drift compensation approaches are desirable.

SUMMARY

In an embodiment, the present disclosure provides a system for voltage or temperature drift compensation in a serializer/deserializer, the system comprising: a SerDes receiver including a data sampler; receiver logic comprising a forward error correction (FEC) module in communication with the SerDes receiver; and a drift compensation engine (DCE) in communication with the FEC module. The DCE is configured to receive live traffic error corrections from the FEC module. The DCE comprises at least one error bias counter (EBC) configured to accumulate live traffic error corrections, for example based on FEC operations performed on live traffic passing through the SerDes receiver. The DCE is further configured to provide a drift compensation command to the data sampler, the drift compensation command being based on an error bias associated with the collected live traffic error corrections. The SerDes receiver is configured to adjust a sampling voltage of the data sampler based on the provided drift compensation command.

In an example embodiment, the at least one EBC comprises: a hardware register configured to store a current error bias value; and an add/subtract element configured to increment or decrement the stored current error bias value in response to the received live traffic error corrections from the FEC module. In an example embodiment, the hardware register accumulates error bias statistics associated with the received live traffic error corrections, for example to determine the current error bias value. In an example embodiment, the hardware register accumulates the error bias statistics associated with the received live traffic error corrections over a finite statistics collection period and the DCE provides the drift compensation command to the data sampler at the end of the statistics collection period.

In an example embodiment, the DCE receives one or more errors per FEC block from the FEC module. In an example embodiment, the DCE only receives the first error of each symbol in a FEC block, for example based on configuration of the FEC module or the DCE.

In an example embodiment, the error bias comprises a difference between a number of bits changed from 0 to 1 by the FEC module, and a number of bits changed from a 1 to 0 by the FEC module.

In an example embodiment, the DCE resets the EBC at the end of a current statistics collection period, or at the beginning of a new statistics collection period.

In an example embodiment, the DCE further comprises: a threshold detector configured to identify whether a threshold criterion has been achieved, the DCE providing the drift compensation command in response to the threshold criterion having been achieved.

In an example embodiment, the threshold detector is configured to detect whether the accumulated statistics reach a threshold value. In an example embodiment, the threshold detector is configured to detect whether a statistics collection period has been completed. In an example embodiment, the statistics collection period is between about 1 millisecond and about 1 second.

In an example embodiment: the at least one EBC comprises a plurality of EBCs; the threshold detector comprises a plurality of threshold detectors equal in number to the plurality of EBCs, each threshold detector being paired with a unique one of the plurality of data samplers; and the DCE further comprises a configuration register storing a threshold criterion associated with the counter with which the threshold detector is paired.

In an example embodiment: the at least one EBC comprises a plurality of EBCs; the threshold detector comprises a single threshold detector, and the DCE further comprises a configuration register storing a plurality of threshold criteria, each threshold criterion being associated with the EBC with which the threshold detector is paired.

In an example embodiment: the SerDes receiver comprises a plurality of data samplers; and the at least one EBC comprises a plurality of EBCs equal in number to the plurality of data samplers. Each EBC in the plurality of EBCs is paired with a unique one of the data samplers. Each EBC in the plurality of EBCs is configured to calculate a live traffic error correction statistic associated with the data sampler with which the EBC is paired.

In an example embodiment: the SerDes receiver comprises a plurality of data samplers; and the at least one EBC comprises: a single EBC configured to associate each error correction with a unique one of the data samplers of the plurality of data samplers.

In an example embodiment: the SerDes receiver comprises a plurality of data samplers; and the at least one EBC comprises: a plurality of EBCs; and an error discriminator configured to identify the data sampler uniquely responsible for each error correction.

In an example embodiment, the FEC module is configured to output to the drift compensation engine, in parallel, a received pattern and a corrected output, the corrected output comprising the corrected pattern or a correction mask to be applied to the received pattern to generate the corrected pattern.

In an example embodiment, the FEC module is configured to output, to the drift compensation engine, bit corrections that have occurred in the FEC module.

In an example embodiment, the SerDes receiver comprises: a local accumulator, associated with the data sampler, configured to increment or decrement a current digital sampling level based on the received drift compensation command; and a digital/analog converter (DAC), in communication with the local accumulator and associated with the data sampler, configured to generate in analog form a current sampling voltage calibration value based on the digital sampling level.

In an example embodiment, the local accumulator comprises: a LA register configured to store a digital sampling level associated with the current sampling voltage; and an add/subtract element configured to increment or decrement the stored digital sampling level in response to outputs from the drift compensation engine.

In an example embodiment: the data sampler comprises first and second data samplers, and the at least one EBC comprises: a first EBC configured to calculate a first live traffic error correction statistic associated with the first data sampler, and a second EBC counter configured to calculate a second live traffic error correction statistic associated with the second data sampler.

In an example embodiment, the data sampler comprises: an even plus sampler for sampling an even bit assuming a previous sample was a 1; an even minus sampler for sampling an even bit assuming a previous sample was a 1; an odd plus sampler for sampling an odd bit assuming a previous sample was a 0; an odd minus sampler for sampling an odd bit assuming a previous sample was a 0. In such an example embodiment, the DCE comprises: a first EBC configured to collect a first live traffic error correction statistic associated with the even plus sampler; a second EBC configured to collect a second live traffic error correction statistic associated with the even minus sampler; a third EBC configured to collect a third live traffic error correction statistic associated with the odd plus sampler; and a fourth EBC configured to collect a fourth live traffic error correction statistic associated with the odd minus sampler.

In an embodiment, the present disclosure provides a method of voltage or temperature drift compensation for a serializer/deserializer receiver, the method comprising: performing, at receiver logic comprising a forward error correction module, forward error correction on live traffic passing through the SerDes receiver; generating, at the FEC module, live traffic error corrections based on the FEC operations performed on the live traffic passing through the SerDes receiver; generating, at a drift compensation engine, a drift compensation command for a data sampler in the SerDes receiver, the drift compensation command being generated based on collected statistics associated with the live traffic error corrections; and adjusting a sampling voltage at the data sampler based on the received drift compensation command.

In another embodiment, the present disclosure provides a processor-implemented method for voltage or temperature drift compensation for a serializer/deserializer receiver including a data sampler, the processor-implemented method comprising: receiving, from a forward error correction module, live traffic error corrections, the live traffic error corrections being collected based on FEC operations performed on live traffic passing through the SerDes receiver; generating a drift compensation command based on statistics associated with the received live traffic error corrections; and sending the drift compensation command to the SerDes receiver for adjusting a sampling voltage of the data sampler.

In an embodiment, the present disclosure provides a device for enabling voltage or temperature drift compensation for a serializer/deserializer receiver including a plurality of data samplers. The device comprises an error discriminator configured to receive, from a forward error correction (FEC) module, live traffic error corrections, and to provide a discrimination output to identify the data sampler in the plurality of data samplers uniquely responsible for each error correction. The device comprises at least one error bias counter, in communication with the error discriminator, the at least one error bias counter configured to identify a data sampler with which an error correction is associated, based on the discrimination output. The device comprises a threshold detector configured to identify whether a threshold criterion associated with the at least one counter has been achieved. The device provides a drift compensation command for one of the plurality of data samplers based on statistics associated with the live traffic error corrections and in response to the threshold criterion having been achieved.

DETAILED DESCRIPTION

A method and system are provided for drift compensation, providing a live data approach to offset calibration, such as for voltage and/or temperature drift. A serializer/deserializer system includes a SerDes receiver and receiver logic, the receiver logic including a forward error correction module. A drift compensation device, or drift compensation engine, receives live error corrections from the FEC module based on FEC operations performed on live traffic passing through the SerDes receiver. A drift compensation command is provided to a data sampler in the SerDes receiver, to adjust a sampling voltage of the data sampler. When the system includes a plurality of data samplers, the drift compensation device determines the data sampler with which an error correction is associated. The drift compensation command can be sent after a threshold criterion is satisfied, such as completion of a statistics collection period, or a threshold number of corrections.

Other aspects and features of the present disclosure will become apparent to those ordinarily skilled in the art upon review of the following description of specific embodiments in conjunction with the accompanying figures.

As integrated circuit geometries decline, components such as samplers in a SerDes receiver are becoming more sensitive to VT-drift. Embodiments of the present disclosure provide a live data method for OsCal, the need for which is increasingly important. SerDes data rates have increased to the point where channels are significantly band-limited and robust receiver design is challenging. This is evidenced by the recent requirement to include Forward Error Correction on SerDes links. Live-data data-sampler OsCal, according to embodiments of the present disclosure as described herein, is an important addition to modern SerDes links to increase their link margin, stability from lane to lane and their robustness to operating conditions.

Recently SerDes systems have incorporated the use of FEC to improve link performance. With FEC included, embodiments of the present disclosure advantageously use information about the corrections performed by the FEC engine, or FEC module, to correct drift in the data samplers that may have occurred due to voltage or temperature changes on the device (VT-drift). Such drift correction is generally referred to as Offset Calibration, VT-Offset Calibration or OsCal. Embodiments of the present disclosure use FEC correction statistics to perform offset calibration on live data.

Figure 3:
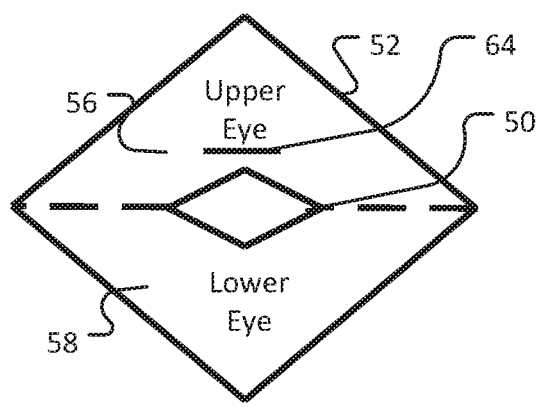
FIG. 3 illustrates an eye diagram for a sampler having an offset sampling level.
Figure 4:
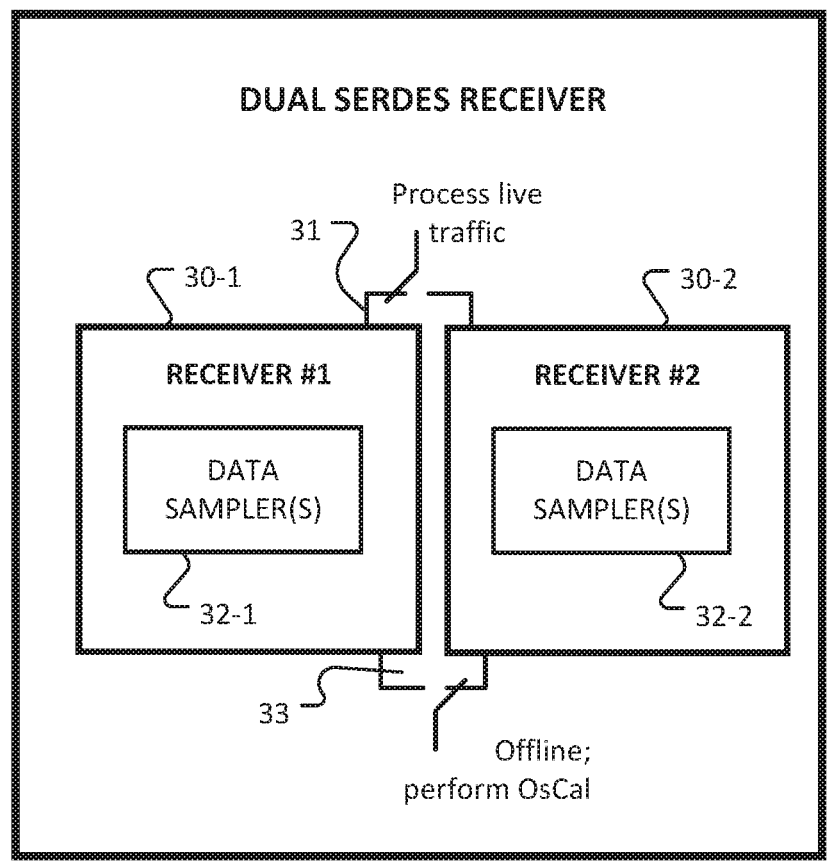
FIG. 4 illustrates a known dual SerDes receiver.

When voltage and temperature change, other characteristics change, including the sampling level, also referred to as the DC sampling point, or sampling location. For example, such changes in supply voltage can have significant impacts on the sampling point of a data sampler. As geometry drops, voltage and temperature delta effects are increased. As well, the "eye" illustrated in FIGS. 3 and 4 is shrinking compared to previous generations of SerDes due to increasing speed of links and the limits placed on the channel. Ten years ago, a drift of 10 mV did not matter. Now, with some implementations only having a 30-40 mV high eye to begin with, a 10-15 mV variance has a significant negative impact and a receiver will not work properly unless the drift is dynamically corrected.

Figure 5:
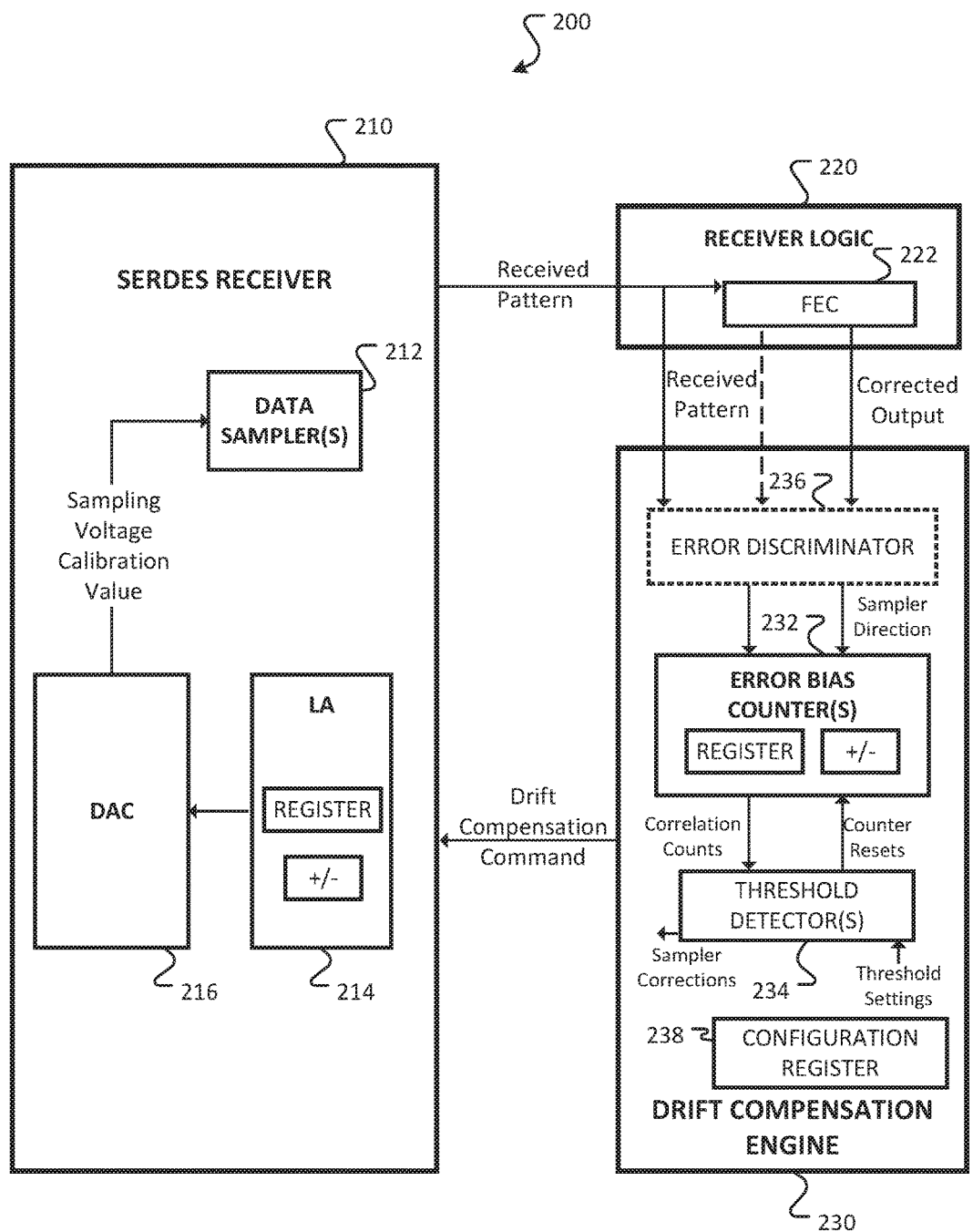
FIG. 5 illustrates a SerDes system according to an embodiment of the present disclosure.

FIG. 5 illustrates a system 200 for voltage and/or temperature drift compensation in a serializer/deserializer according to an embodiment of the present disclosure. The system includes a SerDes receiver 210, comprising data sampler(s) 212, in communication with receiver logic 220. The SerDes receiver 210 can be used across multiple standards and comprises mostly analog circuitry. In an example implementation, the SerDes receiver 210 receives data on a single pin at 24-35 Mbps. The receiver logic 220 comprises a FEC module 222 in communication with the SerDes receiver 210.

A drift compensation engine (DCE), or drift compensation device, 230 is in communication with the FEC module 222 and configured to receive live traffic error corrections from the FEC module 222. The DCE 230 comprises at least one error bias counter (EBC) 232 configured to accumulate live traffic error corrections from the FEC module 222 based on FEC operations performed on live traffic passing through the SerDes receiver 210. In an example embodiment, the at least one EBC 232 comprises a hardware register, such as a plurality of D Flip-flops, to store a current error bias value. In an example embodiment, the at least one EBC 232 comprises an add/subtract element, for example an adder/subtractor circuit or adder/subtractor logic, configured to increment or decrement the stored current error bias value in response to the received live traffic error corrections from the FEC module.

In an embodiment, the at least one EBC 232 is a statistics gathering counter configured to gather error correction statistics from the FEC module 222. In an example implementation, the at least one EBC 232 is configured to accumulate live traffic error notifications based on comparing the pattern received by the receiver logic 220 with a corrected output from the FEC 222. In an example embodiment, the corrected output comprises the corrected pattern, which is presumed to be the expected pattern that was sent from the transmitter. In another embodiment, the corrected output comprises a correction mask to be applied to the received pattern to generate the corrected pattern.

The DCE 230 is further configured to provide a drift compensation command to the data sampler(s) 212. The drift compensation command is based on statistics associated with the received live traffic error corrections. The SerDes receiver 210 is configured to adjust a sampling voltage of the data sampler(s) 212 based on the received drift compensation command. In an example embodiment, once every period, for every data sampler, the drift compensation engine 230 sends out a drift compensation command, or pulse, to either adjust the sampling voltage up or down. When there is no change in level, no drift compensation command is sent.

Further details will now be provided on elements in FIG. 5. In a Serial Attached Small-Computer System Interface (SAS) implementation, the receiver logic 220 can be referred to as a SAS protocol layer. In a tough link, for example a 2 foot length of a 22.5 Gb/s link, the FEC 222 is needed to render the link robust enough for user consumption. The expected input bit error rate (BER) is 1e-6. Before the FEC 222 can begin to be used, it is required to synchronize to a data stream, such as a SAS4 stream, which can be a somewhat lengthy and complex process, and FEC alignment must be found. The FEC 222 comprises different elements and parameters based on the protocol implemented. In an example implementation, using the SAS4 standard, the FEC 222 is provided in the SerDes link, for example as part of the receiver logic 220 as illustrated. Alternatively, the FEC 222 is separate from the receiver logic, and provided somewhere after the SerDes receiver 210, after the FEC boundaries have been found, and before the drift compensation engine 230. In an example embodiment using SAS4, a FEC block of 150 bits is received in 3 cycles of 50 bits.

As shown in FIG. 5, the received pattern is the raw output received from the SerDes receiver 210 at the receiver logic 220, and in an example implementation comprises raw 1s and 0s generated by the data sampler(s) 212. The received pattern can be a direct output of the receiver logic 220, or can be one of the outputs provided by the FEC 222. It is common for a FEC to have the ability to output what was input to the FEC. In an embodiment, the corrected output is the corrected pattern that is taken to be the expected pattern, also referred to as the corrected output from the FEC 222 after error correction. The FEC 222 removes the errors from the raw received information and returns it to an error-free condition, which is nominally what was sent, or expected. The received pattern comprises live data which is compared with the corrected pattern to identify the bit corrections that were performed by the FEC 222. Prior art OsCal methods are not performed using live data reception but instead are performed when data is not running, and the analog input to the sampler itself is instead a calibration value or sequence. In an embodiment, both the received pattern and the corrected output are output in parallel from the FEC 222 to the drift compensation engine 230. In an alternative embodiment, only the bit corrections that have occurred are provided as an input to the DCE 230, for example to error bias counter(s) 232, within the DCE 230.

The SerDes receiver 210 comprises one or more data samplers 212. The data sampler(s) 212 can be any type of digitizer or sampler, such as a non-return to zero (NRZ) sampler with 2 levels of transmitters sending for example two levels at +0.5V and −0.5V. In the case of PAM4, the data samplers comprise 3 samplers sampling between the four different levels to create two output bits every sampling time.

The number of samplers in the SerDes receiver 210 can be anywhere from 1 to 20 or more. Current practical systems tend to have between 4 and 16 data samplers. In an example embodiment with one data sampler, the SerDes receiver 210 comprises a local accumulator (LA) 214 and a digital/analog converter (DAC) 216 associated with the data sampler 212. In example embodiments with more than one data sampler 212, each data sampler 212 has an associated LA 214 and DAC 216. The data sampler 212 is an analog component that converts an input analog value, or voltage, to a digital value (1 or a 0).

In an embodiment of the present disclosure, the local accumulator 214 is associated with the data sampler 212, and configured to increment or decrement a current sampling level, which can be stored in a register of the LA 214, based on the received drift compensation command received from the drift compensation engine 230. In an example implementation, the LA 214 keeps track of the current sampling level, net of all previous startup settings and increment or decrement commands. In an example embodiment, the LA 214 comprises a register, such as a plurality of D Flip-flops, to hold the current sampling level, or sampling location, for example in a digital format. In an example implementation, the number of bits in the register of the LA 214 is the same as the number of bits in the DAC 216, for example 5 to 8 bits.

In an example embodiment, the LA 214 comprises an add/subtract element, for example an adder/subtractor circuit or adder/subtractor logic, configured to increment or decrement the stored current sampling level in response to outputs from the drift compensation engine 230. In an example implementation, the add/subtract element implements+/−1, and generates an enable pulse that allows the stored value to be updated. The LA 214 accumulates all updates and holds the latest value, for example stored digitally in a register, such as in a format compatible with the DAC 216. The LA 214 holds a digital sampling level value that is connected to the input of the DAC 216, and the sampling level value is intentionally incremented or decremented by 1 digital step, which can be the minimum step-size of the associated DAC 216. In an example implementation, the precision of this LSB (Least Significant Bit) does not need to be exact, but should be a reasonably small value, such as ~1 mV per step. In an example embodiment, the LA 214 comprises an up/down counter which includes a registered value, representing the current sampler correction level. In response to up/down commands from the DCE 230, the value presented on the register of the LA 214 will be incremented by one or decremented by one (or the value can remain unchanged in the event that no update command has been issued). The output of the LA 214 is the stored correction level.

The DAC 216 is in communication with the LA 214 and associated with the data sampler 212, and configured to output a current sampling level, or sampling location. In an example embodiment, the DAC 216 converts the digital registered output of the LA 214 to an analog voltage which is used to set the sampling level. Because the input to the DAC 216 is static, with low-frequency changes as initiated by the DCE 230, the output of the DAC 216 is also static. After initial calibration, the output of the LA 214 is provided to the DAC 216 to put the data value at 0 based on initial offset calibration. The output of DAC 216 determines the sampling level. In an example implementation, the data sampler 212 comprises a sampling filter in communication with the DAC 216. The output of the DAC 216 is an analog voltage that sets the sampling level of the data sampler 212. Considering that the data sampler 212 acts as a comparator, if the input analog signal is higher than the DAC analog voltage, then the received bit is a 1, otherwise it is a 0. In an example implementation, the data sampler(s) 212 is/are associated with a DAC 216 to allow the sample level to be set, for startup (off-line) offset calibration or to pre-computed levels based on the inter-symbol interference of the link, or both. In an example implementation, the digital value coming out of the LA 214 is a grey-coded value, and the DAC 216 is built to expect grey-coded input values. Grey coding is a known approach according to which, when a value is incremented by 1, only 1 bit of the multi-bit DAC input value changes.

In an example embodiment, the error bias associated with the received live traffic error corrections comprises a difference between a number of bits changed from 0 to 1 by the FEC 222, and a number of bits changed from a 1 to 0 by the FEC 222. In an example embodiment, the error bias, or error bias statistics, associated with the received live traffic error corrections comprise counting up when a bit is flipped from a 0 to a 1, and counting down when a bit is flipped from a 1 to a 0. In an example embodiment, the DCE 230 comprises an EBC 232 configured to accumulate error corrections, for example based on a difference between the number of bits flipped from 0 to 1 and the number of bits flipped from 1 to 0. In an implementation, the DCE 230 provides a drift compensation command to the data sampler 212 at the end of the statistics collection period based on the error bias associated with the received live traffic error corrections. In an embodiment in which the SerDes receiver 210 comprises a single data sampler 212, all error correction statistics received at the DCE 230 are associated with the single data sampler 212.

In an example embodiment, the statistics used by the DCE 230 comprise a single error bias value calculated based on accumulating the difference between the number of 0 to 1 corrections (an "up" correction") and the number of 1 to 0 corrections (a "down" correction) over time according the corrections being performed by the FEC 222 over many bits. An error bias value of zero indicates that both types of corrections ("up" and "down") are equally likely, or occurred an equal amount of times. A large positive or negative error bias value indicates the errors are biased. For example: a large positive error bias value indicates that the errors are biased to flipping from a 0 to a 1, and that the sampling level is too low and should be increased to move the error bias toward zero; and a large negative error bias value indicates that the errors are biased to flipping from a 1 to a 0, and that the sampling level is too high should be decreased to move the error bias toward zero. An ideal error bias value would read exactly 0, meaning that there have been an equal number of up corrections and down corrections.

In known FEC implementations, such accumulation of corrections is not performed. Moreover, even in non-FEC implementations in which corrections are counted, such as in LDPC, the counted error corrections are not accumulated, as they are in embodiments of the present disclosure, to provide a drift compensation command to a data sampler based on statistics associated with received live traffic error corrections.

In an example embodiment, hardware registers of the error bias counters 232 accumulate the statistics. In an example implementation, the error bias is defined by the content of the error bias counter 232. In an example implementation, a hardware register in an EBC 232 accumulates statistics based on an up/down counter in the EBC 232, for a finite statistics collection period. The DCE 230 provides the drift compensation command to the data sampler 212 at the end of the statistics collection period and based on statistics associated with the received live traffic error corrections generated by the FEC 222 during the finite period. In an example embodiment, the DCE 230 resets the statistics at the end of a statistics collection period, or at the beginning of a new statistics collection period.

In an example embodiment, the DCE 230 comprises a threshold detector 234 configured to identify whether a threshold criterion has been achieved to determine when to issue a drift compensation command to an LA 214. In an example embodiment, the threshold detector 234 is configured to identify whether a threshold criterion has been achieved, and the DCE 230 provides the drift compensation update command to the data sampler 212 in response to the threshold criterion having been achieved. In an example embodiment, when the threshold detector 234 issues a sampler level update, the associated EBC 232 is reset to zero.

In an alternative implementation, the DCE 230 is in communication with a timer to detect whether a statistics collection period has expired or been completed. In an example implementation, the statistics collection period is between about 1 millisecond and 1 second. In another example implementation, the statistics collection period is tens of milliseconds, or hundreds of milliseconds. For example, for a statistics collection period of 10 milliseconds, the at least one EBC 232 accumulates statistics for bit-corrections up (0 to 1) or down (1 to 0), then after that time the DCE 230 provides a drift compensation command to the data sampler 212. The statistics collection period is chosen taking into account the particular implementation, the frequency of error corrections, and the desire to gather enough correction information over a sufficient number of error events to make a good decision. For example, a statistics collection period that captures a single error event or even 10 error events would not be sufficient; however, a statistics collection period that captures around 100 error events may be statistically significant enough to provide an indication of the condition of the data sampler 212.

In another example embodiment, instead of a statistics collection period, the threshold detector 234 is configured to detect whether the accumulated statistics reach a threshold value, or a terminal count. In an example implementation, a threshold error correction value of +64 triggers generation of a drift compensation command to the data sampler 212 according to which the sampling level is increased; alternatively, a threshold error correction value of −64 triggers generation of a drift compensation command to the data sampler 212 according to which the sampling level is decreased. In some implementations, it may take some time to determine whether the corrections are biased. The terminal method of triggering based on the accumulated statistics reaching a threshold value avoids limitations of time-based approaches where a small time interval such as 10 ms may not pick up the bias, while acting even faster than a time-based method if the bias is significant. In some implementations, the terminal method can be faster and more accurate. In an example implementation, the counter is reset after a certain number of corrected errors has been reached. In another implementation, the counter is reset if no drift compensation command is generated by the end of a defined time period, referred to as a terminal reset threshold.

Referring back to the SerDes receiver 210, the minimum number of data samplers 212 is 1 and many older SerDes designs would have had only 1. However, in a modern receiver the number of data samplers 212 is typically greater than 1. The two primary factors that drive this change are channel inter-symbol interference (ISI) and data speed.

Figure 1A:
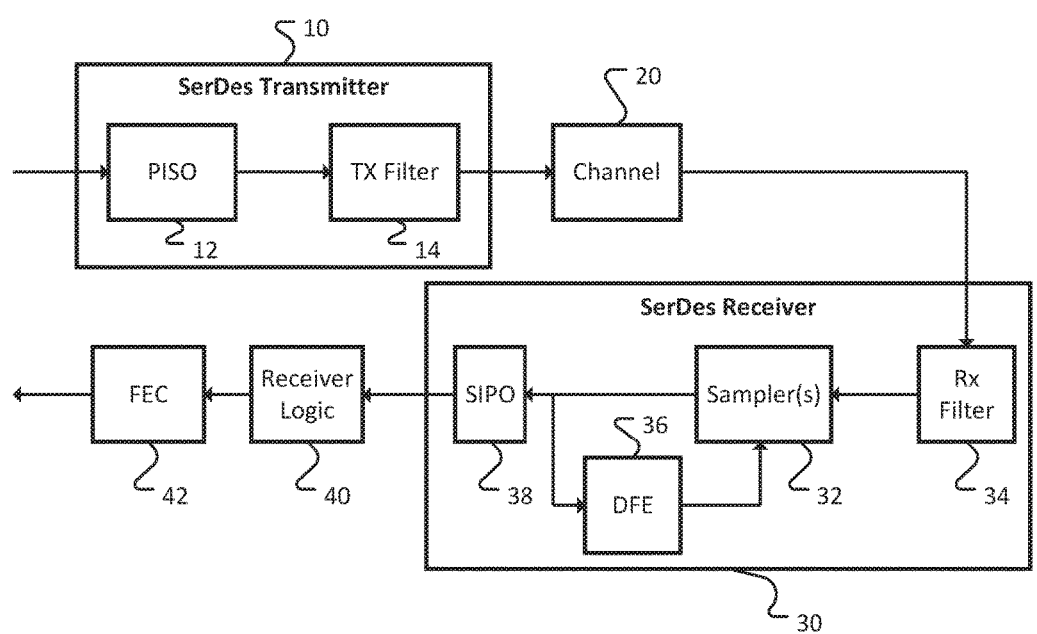
FIG. 1A illustrates a known SerDes communication link.
Figure 1B:
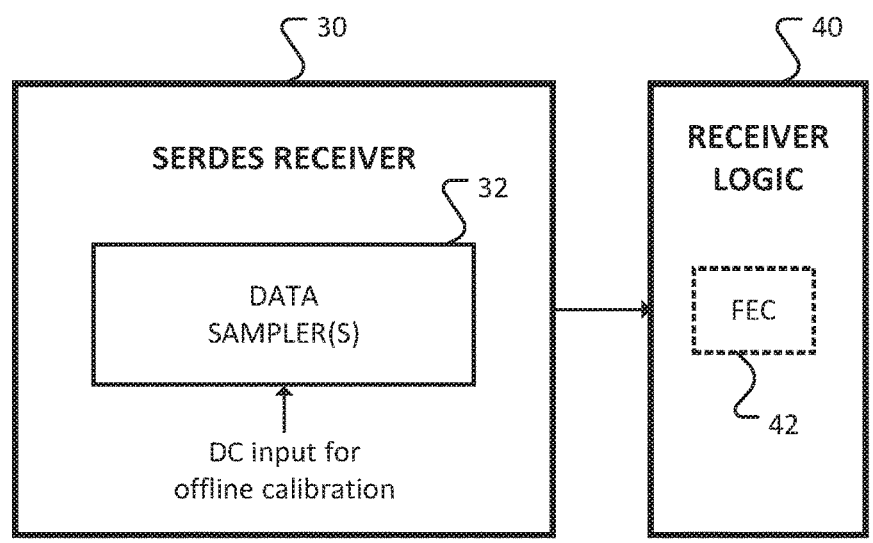
FIG. 1B illustrates a simplified view of a known SerDes receiver and receiver logic.
Figure 2:
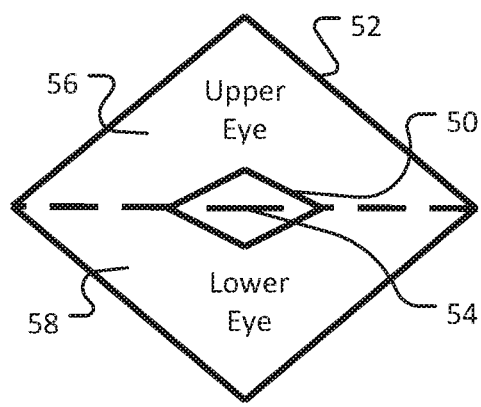
FIG. 2 illustrates an eye diagram for a normal sampler.

In many instances, previously received bits interfere with a current bit, which is referred to as ISI. SerDes receivers use decision feedback estimation (DFE) as shown in FIG. 1A to remove ISI from the channel. If the state of a previous bit is known, then the SerDes receiver 210 can adjust future sampling levels to compensate for the known impact of this previously received bit. With modern data speeds, this is typically done through unrolling, according to which a single sampler is split into two samplers, one sampler where the previous bit was assumed to be a 1 and another sampler where the previous bit was assumed to be a 0. Only one of the two sampled values are correct and this is resolved by the receiver once the value for the previous bit has been determined.

A second way the number of samplers is increased is because many samplers cannot be run at modern rates, such as 22.5 Gbps as in SAS4. Instead, some implementations use to two samplers (termed "odd" and "even"), for example each running at 11.25 Gbps, but taking turns sampling the data. For example, in one time slot the even sampler does a conversion, then the next time slot the odd sampler does a conversion. The odd and even samplers thus share the work. Such sharing of the work can be divided further into a plurality of samplers where 3, 4 or even more physical samplers work in sequence to gather data-bits from a high-speed input signal.

In an example embodiment, a SerDes receiver 210 according to an embodiment of the present disclosure comprises first and second data samplers 212. In such an embodiment, the drift compensation engine 230 comprises: a first error bias counter 232 configured to calculate a first live traffic error bias associated with the first data sampler 212, and a second error bias counter 232 configured to calculate a second live traffic error bias associated with the second data sampler 212. In an embodiment, the error biases (e.g. the running total of 0->1 vs. 1->0 flips) are collected for each data sampler 212 in the system, such that each individual data sampler 212 is associated with, and requires, a separate error bias counter 232.

In an example embodiment, for example when the SerDes receiver comprises a plurality of data samplers 212, the drift compensation engine 230 further comprises an error discriminator 236 configured to receive, from a forward error correction module 222, live traffic error corrections, and to provide a discrimination output to identify the data sampler 212 uniquely responsible for each error correction. The at least one error bias counter 232, which is in communication with the error discriminator 236, is configured to determine which sampler an error correction belongs to or is associated with. In an example embodiment, the error discriminator comprises a logic circuit configured to discriminate a bit number off a bus, a raw result of a previous bit, or both.

In an example implementation of this embodiment, such as shown in FIG. 5, the error discriminator 236 receives, as an input: the pattern received at the input of the FEC module 222; and the corrected output from the FEC module 222. The error discriminator 236, in an example implementation, outputs a sampler level update to the at least one error bias counter 232.

In an embodiment, the DCE 230 comprises a configuration register 238. In an example embodiment, the configuration register 238 stores configuration data such as thresholds, count times and other values used by the EBCs 232, the threshold detector(s) 234, and/or the error discriminator(s) 236. The at least one threshold detector 234, in an example implementation, is configured to obtain threshold settings from the configuration register 238, generate and send counter reset(s) to the at least one error bias counter 232, and output sampler corrections to the data sampler 212, where the sampler corrections comprise, or are used to generate, the drift compensation command.

In an example embodiment: error bias statistics are accumulated in a hardware register of an EBC 232 where the statistics are held; the error discriminator 236 determines a data sampler with which an error correction is associated EBC; and the threshold detector 234 converts the statistics to action on sampler thresholds.

Embodiments of the present disclosure have thus far been described from the perspective of a SerDes system. In an aspect, the present disclosure provides a drift compensation device, such as has been described above as the drift compensation engine 230 in FIG. 5. In an example embodiment, the drift compensation device is a separate device configured for interaction with an existing SerDes receiver 210 and in an operational context that uses a FEC 222. The discussion and illustration of features of the drift compensation engine 230 applies equally to the drift compensation device according to an embodiment of the present disclosure, with the detailed discussion thereof being omitted here for the sake of brevity.

In one embodiment, each time there is a bit correction in an FEC block, as determined by the FEC module 222, the error is sent to the DCE 230. In another embodiment, only a subset of the bit corrections in a FEC block are provided from the FEC module 222 to the DCE 230. As such, in different embodiments, the system can be selective on which errors are sent to the DCE 230. In an example embodiment, the FEC module 222 sends only the first error of each symbol in a FEC block to the DCE 230. This can be advantageous for two reasons: 1) to keep processing bandwidth down and/or simplify hardware requirements; and 2) the first error in a FEC block is a "clean error" that is not impacted by error propagation effects within the DFE equalizer.

Figure 6:
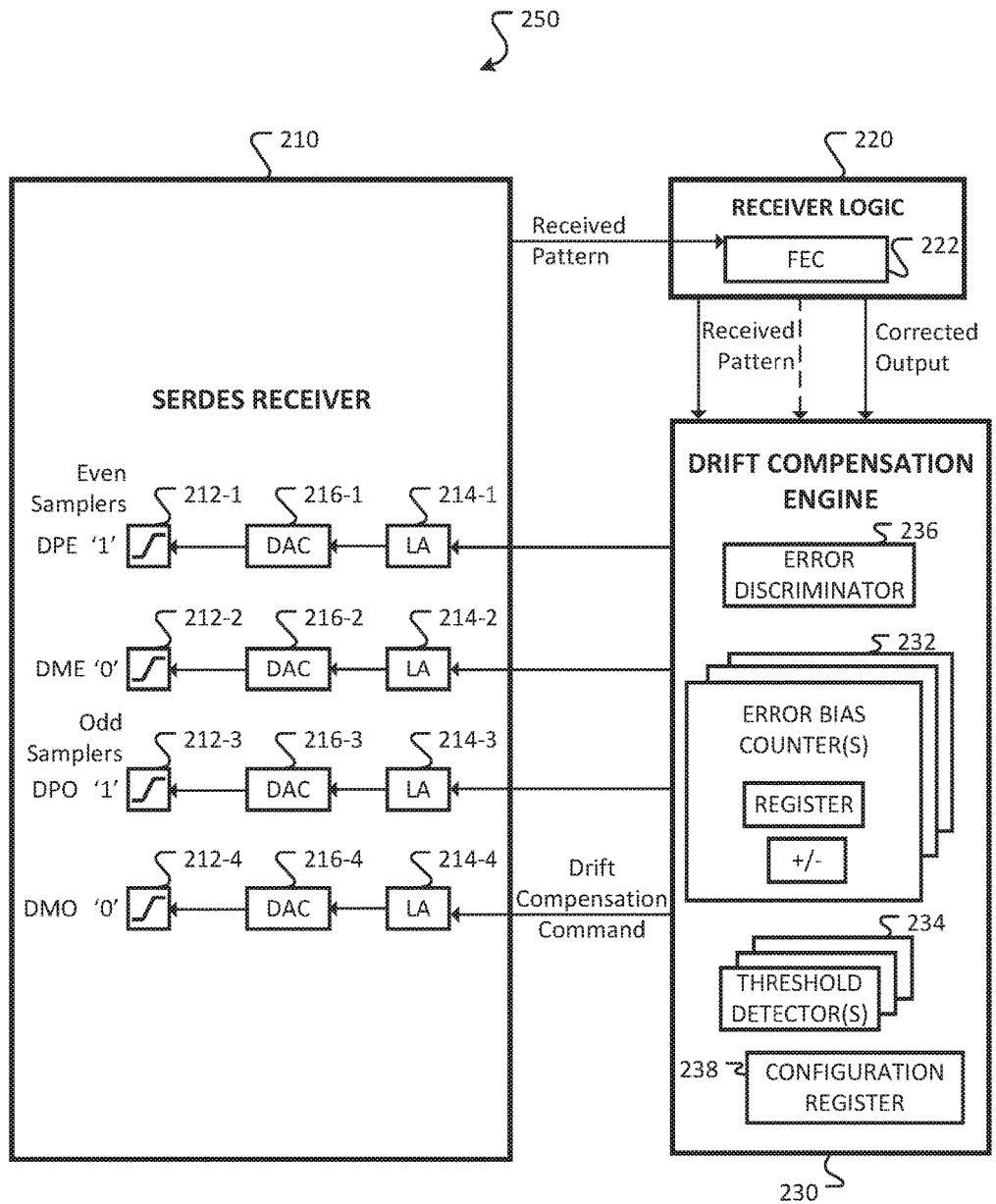
FIG. 6 illustrates a SerDes system according to another embodiment of the present disclosure.

FIG. 6 illustrates a SerDes system 250 according to another embodiment of the present disclosure. In the system 250 of FIG. 6, the SerDes receiver 210 includes a plurality of data samplers 212-1, 212-2, 212-3 and 212-4. The four data samplers in the embodiment of FIG. 6 combine the previously-described odd and even sharing implementation with unrolling of the DFE function. In general, the drift compensation engine 230 comprises one or more error bias counters 232 configured to accumulate error corrections. In an example embodiment, the DCE 230 comprises a plurality of error bias counters 232 equal in number to the plurality of data samplers 212, with each error bias counter 232 being associated with, or paired with, one of the data samplers 212. The example embodiment of FIG. 6 comprises four error bias counters 232. In an example embodiment, each error bias counter 232 in a plurality of error bias counters is configured to calculate a live traffic error bias associated with the data sampler 212 with which the counter is paired.

In another embodiment having a plurality of data samplers, the DCE 230 comprises a single error bias counter 232 configured to determine a unique data sampler 212 of the plurality of data samplers 212 with which an error correction is associated.

In an example embodiment, for any error event, exactly one error bias counter 232 associated with an error correction, is updated, either counting up by 1 or counting down by 1.

In an example embodiment, the plurality of data samplers 212 comprises an even sampler 212 configured to generate data for all the "even" bits in the stream, and an odd sampler 212 configured to generate all the "odd" bits in the stream. The two samplers 212 take turns sampling the input waveform, so every second bit is taken by the same physical sampler 212. In an example implementation, on the parallel bus arriving at the FEC input (for example, 3 clock periods of 50 bits each), bits 0, 2, 4 etc. are samples generated by the even sampler and bits 1, 3, 5 etc. are samples generated by the odd sampler.

In the example embodiment of FIG. 6, the SerDes receiver 210 comprises four samplers, namely: an even plus data sampler 212-1 for sampling an even bit assuming a previous sample was a 1; an even minus data sampler 212-2 for sampling an even bit when a previous sample was a 1; an odd plus data sampler 212-3 for sampling an odd bit when a previous sample was a 0; and an odd minus data sampler 212-4 for sampling an odd bit when a previous sample was a 0. In an example embodiment compatible with such an implementation of data samplers 212, the DCE 230 comprises: a first error bias counter 232 configured to calculate or determine a first live traffic error bias associated with the even plus sampler 212-1; a second error bias counter 232 configured to calculate or determine a second live traffic error bias associated with the even minus sampler 212-2; a third error bias counter 232 configured to calculate or determine a third live traffic error bias associated with the odd plus sampler 212-3; and a fourth error bias counter 232 configured to calculate or determine a fourth live traffic error bias associated with the odd minus sampler 212-4.

In an example embodiment, the DCE 230 comprises an error discriminator 236 configured to determine a data sampler 212 with which an error correction is associated. In an example embodiment, the error discriminator 236 determines a data sampler 212 with which an error correction is associated, such as by determining: Is this an even or odd bit? What was the previous bit on the raw input? In an example implementation in which the DCE 230 includes a plurality of error bias counters 232, the error discriminator 236 associates the error with a unique one of the plurality of data samplers 212. In an embodiment, the error discriminator 236 identifies the data sampler 212 responsible for each error correction indicated by the FEC module 222.

Similar to FIG. 5, the embodiment of the DCE 230 in FIG. 6 comprises one or more threshold detectors 234 configured to identify whether a threshold criterion has been achieved to determine when to generate a drift compensation update command. In an implementation, the one or more threshold detectors 234 are configured to detect whether a threshold number of corrected errors has been reached. In an implementation, the one or more threshold detectors 234 are configured to detect whether a statistics collection period has expired or been completed. In an example embodiment, the DCE 230 comprises a plurality of threshold detectors 234 equal in number to the plurality of counters 232, with each threshold detector being associated with, or paired with, one of the counters 232. In an example embodiment, each threshold detector 234 in a plurality of threshold detectors 234 is in communication with a configuration register 238 storing a threshold criterion associated with the respective counter 232 with which the threshold detector 234 is paired. In an example embodiment, the threshold criterion is set at a single configuration register 238 and shared between the plurality of detectors, each of which can be a digital comparator that indicates whether or not the threshold value has been exceeded. In another embodiment, the DCE 230 comprises a single threshold detector 234 comprising a memory storing a plurality of threshold criteria, each threshold criterion being associated with the counter 232 with which the threshold detector is paired.

In an example embodiment, the DCE 230 of the device 250 comprises an error discriminator 236, at least one error bias counter 232, and at least one threshold detector 234, for example communicating with each other as described above with respect to the example embodiment of FIG. 5.

As mentioned earlier, ISI makes the value from time n−1 (immediately previous bit) difficult to sample at time n. As shown in FIG. 6, the P samplers 212-1 and 212-3 assume the previous sample was a 1, and the M samplers 212-1 and 212-4 assume that the previous sample was a 0. In another embodiment, not shown, instead of unrolling once (for one previous bit), the SerDes receiver unrolls twice, where the previous 2 bits have all previous settings have different samplers, which expands the number of data samplers to 8 (one each for previous 2 bits of 00, 01, 10, 11, and odd and even versions of each). The DCE 230 associates the received error correction statistic with the correct data sampler 212 (even or odd, P or M version), for example based on results from the error discriminator 236 and the error bias counters 232. In the example embodiment of FIG. 6, the DCE 230 comprises 4 error bias counters 232, one for each of 4 data samplers 212, providing a separate error bias statistic for each sampler.

Embodiments of the present disclosure can be implemented in any product line where a SerDes link includes FEC, such as the RS(30,26,5) FEC block used in SAS4. In an example embodiment using RS(30,26,5): 30 is total number of symbols; 26 is number of data symbols; 5 is symbol size. The total number of parity bits for this implementation is (30−26)*5=20 bits and the total FEC block size is 30*5=150 total bits. This results in a total data size of 26*5=130 data bits. Currently any product that supports SAS4 would benefit from embodiments of the present disclosure. In some other standards, a RS(544,514,10) FEC is used to improve link performance for PAM4 56G applications.

Embodiments of the present disclosure provide a system, method and device that each enable calibration of a SerDes receiver in real-time using live-data and without requiring a duplicate receiver. According to embodiments of the present disclosure, an advantage is that the SerDes receiver does not have to be taken off line to perform calibration.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A system for voltage or temperature drift compensation in a serializer/deserializer (SerDes), the system comprising:
   a SerDes receiver including a data sampler;
   receiver logic comprising a forward error correction (FEC) module in communication with the SerDes receiver; and
   a drift compensation drift compensation engine (DCE) in communication with the FEC module and configured to receive live traffic error corrections from the FEC module, the DCE comprising at least one error bias counter (EBC) configured to accumulate the received live traffic error corrections, the DCE further configured to provide a drift compensation command to the data sampler, the drift compensation command being based on an error bias associated with the collected received live traffic error corrections,
   the SerDes receiver configured to adjust a sampling voltage of the data sampler based on the provided drift compensation command.

2. The system of claim 1 wherein the at least one EBC comprises:
   a hardware register configured to store a current error bias value; and
   an add/subtract element configured to increment or decrement the stored current error bias value in response to the received live traffic error corrections from the FEC module.

3. The system of claim 2 wherein the hardware register accumulates error bias statistics associated with the received live traffic error corrections.

4. The system of claim 2 wherein the hardware register accumulates error bias statistics associated with the received live traffic error corrections over a finite statistics collection period and the DCE provides the drift compensation command to the data sampler at the end of the statistics collection period.

5. The system of claim 1 wherein the DCE receives one or more errors per FEC block from the FEC module.

6. The system of claim 1 wherein the DCE only receives the first error of each symbol in a FEC block.

7. The system of claim 1 wherein the error bias comprises a difference between a number of bits changed from 0 to 1 by the FEC module, and a number of bits changed from a 1 to 0 by the FEC module.

8. The system of claim 1 wherein the DCE resets the EBC at the end of a current statistics collection period, or at the beginning of a new statistics collection period.

9. The system of claim 1 wherein the DCE further comprises:
   a threshold detector configured to identify whether a threshold criterion has been achieved,
   the DCE providing the drift compensation command in response to the threshold criterion having been achieved.

10. The system of claim 9 wherein the threshold detector is configured to detect whether the accumulated statistics reach a threshold value.

11. The system of claim 9 wherein the threshold detector is configured to detect whether a statistics collection period has been completed.

12. The system of claim 11 wherein the statistics collection period is between about 1 millisecond and about 1 second.

13. The system of claim 9 wherein:
   the at least one EBC comprises a plurality of EBCs,
   the threshold detector comprises a plurality of threshold detectors equal in number to the plurality of EBCs, each threshold detector being paired with a unique one of the plurality of data samplers, and
   wherein the DCE further comprises a configuration register storing a threshold criterion associated with the counter with which the threshold detector is paired.

14. The system of claim 9 wherein:
   the at least one EBC comprises a plurality of EBCs,
   the threshold detector comprises a single threshold detector, and
   wherein the DCE further comprises a configuration register storing a plurality of threshold criteria, each threshold criterion being associated with the EBC with which the threshold detector is paired.

15. The system of claim 1 wherein:
the SerDes receiver comprises a plurality of data samplers; and
the at least one EBC comprises:
a plurality of EBCs equal in number to the plurality of data samplers, each EBC in the plurality of EBCs being paired with a unique one of the data samplers, each EBC in the plurality of EBCs being configured to calculate a live traffic error correction statistic associated with the data sampler with which the EBC is paired.

16. The system of claim 1 wherein:
the SerDes receiver comprises a plurality of data samplers; and
the at least one EBC comprises:
a single EBC configured to associate each error correction with a unique one of the data samplers of the plurality of data samplers.

17. The system of claim 1 wherein:
the SerDes receiver comprises a plurality of data samplers; and
the at least one EBC comprises:
a plurality of EBCs; and
an error discriminator configured to identify the data sampler uniquely responsible for each error correction.

18. The system of claim 1 wherein the FEC module is configured to output to the drift compensation engine, in parallel, a received pattern and a corrected output, the corrected output comprising the corrected pattern or a correction mask to be applied to the received pattern to generate the corrected pattern.

19. The system of claim 1 wherein the FEC module is configured to output, to the drift compensation engine, bit corrections that have occurred in the FEC module.

20. The system of claim 1 wherein the SerDes receiver comprises:
a local accumulator, associated with the data sampler, configured to increment or decrement a current digital sampling level based on the received drift compensation command; and
a digital/analog converter (DAC), in communication with the local accumulator and associated with the data sampler, configured to generate in analog form a current sampling voltage calibration value based on the digital sampling level.

21. The system of claim 20 wherein the local accumulator comprises:
a LA register configured to store a digital sampling level associated with the current sampling voltage; and
an add/subtract element configured to increment or decrement the stored digital sampling level in response to outputs from the drift compensation engine.

22. The system of claim 1 wherein:
the data sampler comprises first and second data samplers, and
the at least one EBC comprises:
a first EBC configured to calculate a first live traffic error bias associated with the first data sampler, and
a second EBC counter configured to calculate a second live traffic error bias associated with the second data sampler.

23. The system of claim 1 wherein:
the data sampler comprises:
an even plus sampler for sampling an even bit assuming a previous sample was a 1;
an even minus sampler for sampling an even bit assuming a previous sample was a 1;
an odd plus sampler for sampling an odd bit assuming a previous sample was a 0;
an odd minus sampler for sampling an odd bit assuming a previous sample was a 0; and
the DCE comprises:
a first EBC configured to calculate a first live traffic error bias associated with the even plus sampler;
a second EBC configured to calculate a second live traffic error bias associated with the even minus sampler;
a third EBC configured to calculate a third live traffic error bias associated with the odd plus sampler; and
a fourth EBC configured to calculate a fourth live traffic error bias associated with the odd minus sampler.

24. A method of voltage or temperature drift compensation for a serializer/deserializer (SerDes) receiver, the method comprising:
performing, at receiver logic comprising a forward error correction (FEC) module, forward error correction on live traffic passing through the SerDes receiver;
generating, at the FEC module, live traffic error corrections based on the FEC operations performed on the live traffic passing through the SerDes receiver;
generating, at a drift compensation engine, a drift compensation command for a data sampler in the SerDes receiver, the drift compensation command being generated based on collected statistics associated with the generated live traffic error corrections; and
adjusting a sampling voltage at the data sampler based on the received drift compensation command.

25. A processor-implemented method for voltage or temperature drift compensation for a serializer/deserializer (SerDes) receiver including a data sampler, the processor-implemented method comprising:
receiving, from a forward error correction (FEC) module, live traffic error corrections, the live traffic error corrections being collected based on FEC operations performed on live traffic passing through the SerDes receiver;
generating a drift compensation command based on statistics associated with the received live traffic error corrections; and
sending the drift compensation command to the SerDes receiver for adjusting a sampling voltage of the data sampler.

26. A device for enabling voltage or temperature drift compensation for a serializer/deserializer (SerDes) receiver including a plurality of data samplers, the device comprising:
an error discriminator configured to receive, from a forward error correction (FEC) module, live traffic error corrections, and to provide a discrimination output to identify the data sampler in the plurality of data samplers uniquely responsible for each error correction;
at least one error bias counter, in communication with the error discriminator, the at least one error bias counter configured to identify a data sampler with which an error correction is associated, based on the discrimination output; and a threshold detector configured to identify whether a threshold criterion associated with the at least one counter has been achieved, wherein the device provides a drift compensation command for one of the plurality of data samplers based on statistics associated with the live traffic error corrections and in response to the threshold criterion having been achieved.

\* \* \* \* \*